(12) United States Patent
Schreiber et al.

(10) Patent No.: US 11,842,158 B2
(45) Date of Patent: Dec. 12, 2023

(54) INTERPRETABLE SEMANTIC INDICATION OF MACHINE LEARNING OUTPUT

(71) Applicant: SAP SE, Walldorf (DE)

(72) Inventors: Alexander Schreiber, Wimsheim (DE); Vladimir Shapiro, Sinsheim (DE); Joachim Sander, Bensheim (DE)

(73) Assignee: SAP SE, Walldorf (DE)

( * ) Notice: Subject to any disclaimer, the term of this patent is extended or adjusted under 35 U.S.C. 154(b) by 483 days.

(21) Appl. No.: 17/174,425

(22) Filed: Feb. 12, 2021

(65) Prior Publication Data
US 2022/0261549 A1 Aug. 18, 2022

(51) Int. Cl.
*G06F 40/30* (2020.01)
*G06F 3/14* (2006.01)
*G06N 20/00* (2019.01)
*G06F 40/51* (2020.01)

(52) U.S. Cl.
CPC ............... *G06F 40/30* (2020.01); *G06F 3/14* (2013.01); *G06F 40/51* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2021/0201176 A1* | 7/2021 | Dhingra | G06Q 10/0637 |
| 2021/0334693 A1* | 10/2021 | Bavly | G06F 16/24578 |
| 2022/0156614 A1* | 5/2022 | Dalli | G06N 20/00 |

* cited by examiner

*Primary Examiner* — Antim G Shah
(74) *Attorney, Agent, or Firm* — Fish & Richardson P.C.

(57) ABSTRACT

Implementations include receiving, by a semantic translation service of a ML platform, an output data set from a ML model, the output data set including a predicted value and a set of metrics, determining, by the semantic translation service, a numerical value based on at least two or more metrics in the set of metrics, selecting, by the semantic translation service, a semantic result by mapping the numerical value to a projection including two or more semantic values, and transmitting, by the ML platform, a prediction result at least partially including the semantic result for selective display to a user using one or more user interfaces (UIs).

17 Claims, 8 Drawing Sheets

| Search | Type of Wine: | Season: | | | Adapt Filters (1) | |
|---|---|---|---|---|---|---|
| | All | | | | | Go |
| Products (5) | | | | | 402 | |
| | | | | | View Prediction Source | 404 |
| Cultivation/Winery | Region | Quantity | Status | Target Wine Quality | Estimated Wine Quality | |
| Hacienda Araucano<br>Vina Hacienda Araucano S.A. | Valle de Lolol | 1250Kl | Maturing | 9.9 | ↗ 9.6 Premium | > |
| Montes Alpha<br>Vina Hacienda Araucano S.A. | Valle de Colchagua | 500Kl | Maturing | 8.3 | ↗ 7.6 High | > |
| Gran Araucano<br>Vina Hacienda Araucano S.A. | Valle de Colchagua | 1000Kl | In Press | 8.7 | ↙ 6.1 Medium | > |
| Montes Cabernet Sauvignon<br>Vina Hacienda Araucano S.A. | Valle de Lolol | 1700Kl | Crops | 9.0 | 7.4 | > |
| Hacienda Araucano<br>Vina Hacienda Araucano S.A. | Valle de Lolol | 330Kl | In Press | 7.6 | ↗ 7.5 High | > |
| More [ 5 / 60 ] | | | | | | |

*FIG. 4A*

Predicted Wine Quality
Hacienda Araucano, Vina Hacienda Araucano S.A.

9.6▲ / 10 Points ⌐412

Aug 8, 2021, 9:06 AM

Product Description: ⌐414
This wine had been classified as premium quality compared with vintages of the same variety in the past 5 years.

Give Feedback    Compare

| General Information | Monitoring | Product Quality | Log |

Input Parameters (38)

| Indicator | Date | Measurement | Target | Deviation | Data Source |
|---|---|---|---|---|---|
| Alcohol | 12/15/2021 | 12.1% | 12.5% | -0.4% | Mash Samples |
| Residual Sugar | 12/15/2021 | 0.9563 g/ml | 0.9780 g/ml | -0.2783 g/ml | Mash Samples |
| Acidity | 12/15/2021 | 0.3302 g/l | 0.2970 g/l | +0.005 g/l | Mash Samples |
| pH-Value | 12/15/2021 | 3.5 | 3.0 | +0.5 | Mash Samples |
| Minerals | 12/15/2021 | 0.9 g/l | 2.0 g/l | -1.1 g/l | Mash Samples |
| Humidity | 12/15/2021 | 75.0% | 75.0% | 0.0% | Live Monitoring |
| Frost Hours | 12/15/2021 | 0 h | 0 h | 0 h | Live Monitoring |
| Sunshine Hours | 12/13/2021 | 5 h | 7 h | -2 h | Live Monitoring |
| Rain | 12/13/2021 | 450 mm | 500 mm | -50 mm | Live Monitoring |

More

*FIG. 4C*

INTERPRETABLE SEMANTIC INDICATION OF MACHINE LEARNING OUTPUT

BACKGROUND

Technologies related to artificial intelligence (AI) and machine learning (ML), AI and ML being used interchangeably herein, have been widely applied in various fields. In general, AI encompasses a pipeline that includes data collection, feature extraction, training, and inference. Training can be described as a process of training a ML model to perform some function. Inference can be described as a process of using the (trained) ML model to perform the function. Example functions include, without limitation, making recommendations, matching data items, ranking data items, classification, providing probability distributions, and the like. In general, an output of the ML model (i.e., the result of the function) can be referred to as a prediction. However, ML models are black-box to users. For example, data is input to a ML model, and the ML model provides output based on the data. The ML model, however, does not provide an indication as to what resulted in the output (i.e., why the ML model provided the particular result).

Predictions made by ML models can be profound and, in some cases, even deemed essential to activities of users. Because ML models are black-box (e.g., to non-technical users, to users that are uninformed on the development of the ML model), most users only receive the prediction output by the ML model without knowing how the prediction is made. When it comes to critical issues (e.g., medical diagnosis, investment decisions), predictions made by ML models may not be adopted by users. For example, because a user does not understand how and/or why the ML model made the particular prediction, the user might not adopt the prediction. Consequently, with the advent of ML models and AI-based technologies, a trust problem has arisen in users (particularly non-technical users) trusting output of the ML models.

In view of this problem stemming from the development and adoption of AI-based technologies, techniques have been developed to provide insight into how/why predictions are made by the ML models. For example, so-called explainable AI (XAI) has been developed to make the black-box of AI more transparent and understandable. In general, XAI refers to methods and techniques in the application of AI to enable results being more understandable to users, and can include providing reasoning for computed predictions and presenting predictions in an understandable and reliable way.

However, existing technologies for XAI have some deficiencies. For example, it is still difficult for un-trained, non-professional (e.g., users not versed in the particular subject matter that the ML model is applied to), and/or non-technical users (e.g., users not versed in the development, training, and the like of ML models) to understand the result as presented by the XAI. That is, the trust problem between users and AI differs across the spectrum of users. For example, XAI may output natural language descriptions and/or indicators indicating why the prediction result is made and/or what the key features are in the data that affect the prediction result. However, for non-professional users and/or non-technical users the output of the XAI is still not transparent or understandable. That is, for certain users, the XAI output is still too ambiguous to instill trust in whether the prediction is good and/or reliable. Without understanding the meaning of the prediction result, it can be difficult for some users to adopt the prediction and execute actions based on the prediction. Accordingly, there is a need to improve XAI and provide intelligible and usable interpretations and/or explanations of AI-technology predictions for a broader range of users.

SUMMARY

Implementations of the present disclosure are directed to user-interpretable semantic indications for output of machine learning (ML) models. More particularly, implementations of the present disclosure are directed to a semantic translation service that translates output of ML models to a semantic scale that is more easily digestible for a relatively broad range of users. That is, the semantic translation service of the present disclosure provides a semantic meaning to a prediction output by a ML model based on a set of metrics at least partially output by the ML model with the prediction.

In some implementations, actions include receiving, by a semantic translation service of a ML platform, an output data set from a ML model, the output data set including a predicted value and a set of metrics, determining, by the semantic translation service, a numerical value based on at least two or more metrics in the set of metrics, selecting, by the semantic translation service, a semantic result by mapping the numerical value to a projection including two or more semantic values, and transmitting, by the ML platform, a prediction result at least partially including the semantic result for selective display to a user using one or more user interfaces (UIs). Other implementations of this aspect include corresponding systems, apparatus, and computer programs, configured to perform the actions of the methods, encoded on computer storage devices.

These and other implementations can each optionally include one or more of the following features: actions further include retrieving, by the semantic translation service a configuration that is specific to the ML model from computer-readable memory, the configuration defining a relationship between the at least two or more metrics for determining the numerical value and the projection; the projection includes one of a continuous projection and a bucketized projection including two or more categories; the set of metrics includes a confidence score, an accuracy score, an error rate, and an error value; the projection is at least partially selected based on user data representative of the user; actions further include receiving, from an explanation service of the ML platform, an explanation data set representative of a quantitative result at least partially based on the output data set, the explanation data set including a natural language explanation and a set of indicators, the prediction result including the explanation data set; and the semantic result is displayed to the user in a first UI providing a first level of detail of the prediction result and in a second UI providing a second level of detail of the prediction result, the second level of detail being more granular than the first level of detail.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A-4C depict example user interfaces (UIs) in accordance with implementation of the present disclosure.

Like reference symbols in the various drawings indicate like elements.

DETAILED DESCRIPTION

Figure 1:
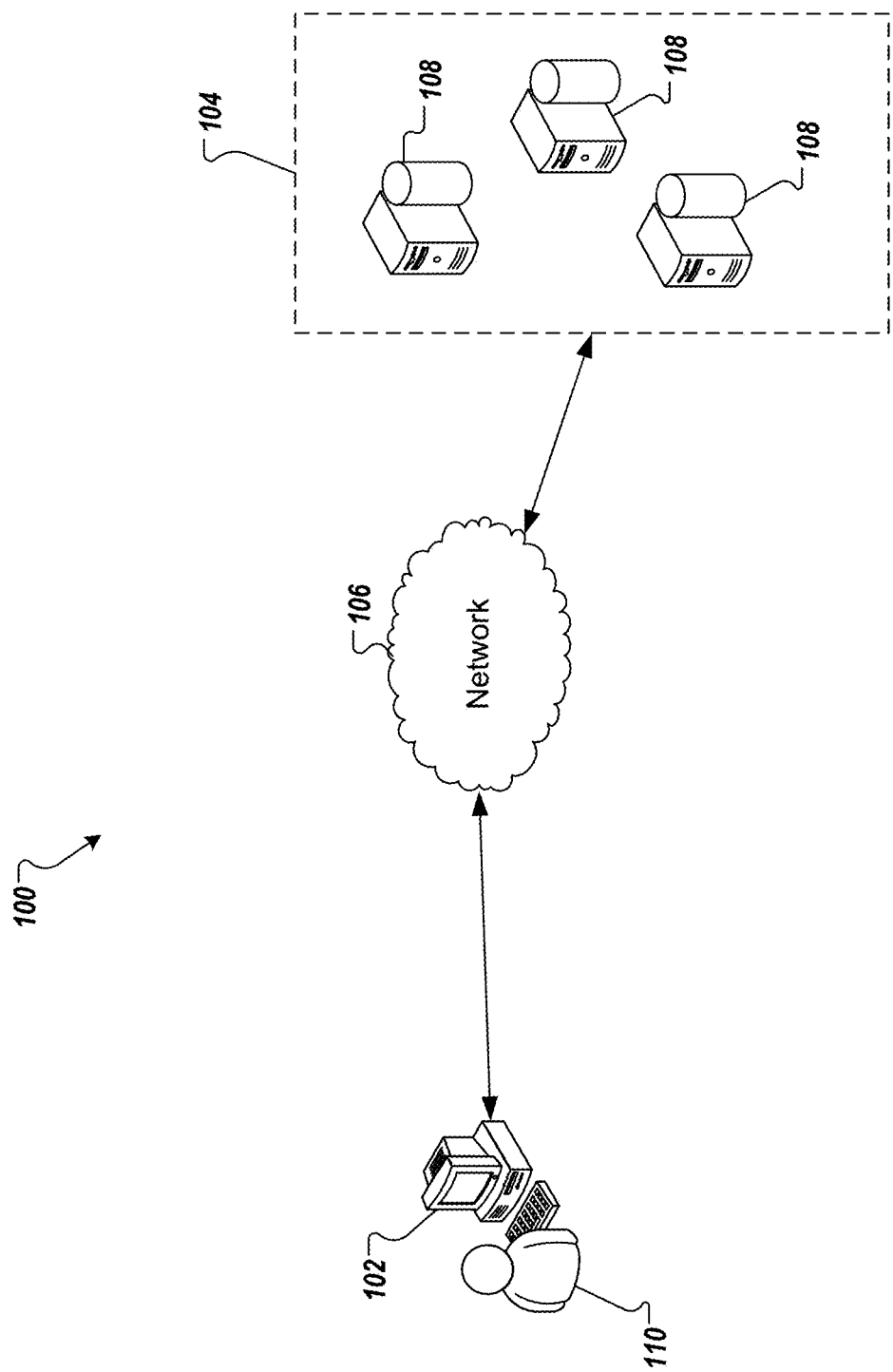
FIG. 1 depicts an example architecture that can be used to execute implementations of the present disclosure.

Implementations of the present disclosure are directed to user-interpretable semantic indications for output of machine learning (ML) models. More particularly, implementations of the present disclosure are directed to a semantic translation service that translates output of ML models to a semantic scale that is more easily digestible for a relatively broad range of users. That is, the semantic translation service of the present disclosure provides a semantic result providing meaning to a prediction output by a ML model based on a set of metrics at least partially output by the ML model with the prediction. Implementations can include actions of receiving, by a semantic translation service of a ML platform, an output data set from a ML model, the output data set including a predicted value and a set of metrics, determining, by the semantic translation service, a numerical value based on at least two or more metrics in the set of metrics, selecting, by the semantic translation service, a semantic result by mapping the numerical value to a projection including two or more semantic values, and transmitting, by the ML platform, a prediction result at least partially including the semantic result for selective display to a user using one or more user interfaces (UIs).

To provide context for implementations of the present disclosure, and as introduced above, technologies related to artificial intelligence (AI) and ML, interchangeably used herein, have been widely applied in various fields. For example, AI technologies are frequently implemented in workflows, in which decisions and/or tasks are to be performed subsequent to output of an AI component (e.g., decisions and tasks that depend on the particular output of the AI component).

In general, AI encompasses a pipeline that includes data collection, feature extraction, training, and inference. Data collection can be described as aggregating historical data that can be used to develop a ML model and train the ML model. Feature extraction can be described as a process for identifying features within data that are more relevant to providing particular output than other features. Training can be described as a process of training a ML model to perform some function. Inference can be described as a process of using the (trained) ML model to perform the function. Example functions include, without limitation, making recommendations, matching data items, ranking data items, classification, providing probability distribution and the like. In general, an output of the ML model (i.e., the result of the function) can be referred to as a prediction. ML models are black-box to users. For example, data is input to a ML model, and the ML model provides output based on the data. The ML model, however, does not provide indication as to what resulted in the output (i.e., why the ML model provided the particular result).

Predictions made by ML models can be profound and, in some cases, even deemed essential to activities of users. Because ML models are black-box, most users (e.g., to non-technical users, to users that are uninformed on the development of the ML model) receive the prediction output by the ML model without knowing how and/or why the prediction is made. When it comes to critical issues (e.g., medical diagnosis, investment recommendations), predictions made by ML models may not be adopted by users. For example, because a user does not understand how and/or why the ML model made the particular prediction, the user might not adopt the prediction. Consequently, with the advent of ML models and AI-based technologies, a trust problem has arisen in users (particularly non-technical users) trusting output of the ML models and/or performing subsequent actions based thereon.

More particularly, ML models output a prediction and a set of metrics. Example metrics can include, without limitation, confidence scores and accuracy scores provided as part of the output of the ML model (e.g., in addition to the prediction itself). For example, a confidence score can indicate a confidence in whether a prediction output by the ML model is correct (e.g., Confidence=82.34%) and an accuracy score indicates how accurate the ML model is in generating correct predictions (e.g., Accuracy=95.00%). In some examples, the confidence score represents a confidence that the particular prediction is accurate. For example, confidence in a particular prediction can be based on the input (e.g., amount of input, quality of input) that is provided to the ML model and that the particular prediction is based on. In some examples, the accuracy score represents how frequently predictions made by the particular ML model are correct (e.g., 95.00% indicating 95 out of 100 predictions are correct and 5 out of 100 are incorrect). However, some users do not know the scale of the values and/or a threshold to indicate whether a particular value is good or bad. For example, a user may receive a prediction result with a confidence score of 90%, but an accuracy score of 50%. It can be confusing to the user as to whether the prediction can be trusted enough to adopt.

Accordingly, the advent of AI technologies created a previously non-existent trust problem between users and the AI technologies. While the trust problem may be more manageable for expert users, the growing ubiquity of AI technologies has permeated the everyday lives of non-expert users. Consequently, the trust problem has grown to affect a broader spectrum of users, many of which are non-professional (e.g., users not versed in the particular subject matter that the ML model is applied to), and/or non-technical users (e.g., users not versed in the development, training, and the like of ML models)

In view of this problem stemming from the development and growing ubiquity of AI-based technologies, techniques have been developed to provide insight into how/why predictions are made by ML models. For example, so-called explainable AI (XAI) has been developed to assist in transparency and understandability of predictions of ML models. In general, XAI refers to methods and techniques in the application of AI to enable results being more understandable to users, and can include providing reasoning for computed predictions and presenting predictions in an understandable and reliable way. However, existing technologies for XAI have some deficiencies. For example, it is still difficult for un-trained, non-professional (e.g., users not versed in the particular subject matter that the ML model is applied to), and/or non-technical users (e.g., users not versed in the development, training, and the like of ML models) to understand the result as presented by the XAI. That is, the trust problem between users and AI differs across the spectrum of users. For example, XAI may output natural language descriptions and/or indicators indicating why the prediction result is made and/or what the key features are in the data that affect the prediction result.

However, for non-professional users and/or non-technical users the output of the XAI is still not transparent or understandable. That is, for certain users, the XAI output is still too ambiguous to instill trust in whether the prediction is good and/or reliable. For example, even given the same confidence scores and accuracy scores, interpretation of the prediction is inconsistent between different users. Without understanding the meaning of the prediction result, it can be difficult for some users to adopt the prediction and execute actions based on the prediction (e.g., make a decision, execute a next task in a workflow). Further, there are no industry standards for XAI output presentations to users, which also contributes to poorly implemented and inconsistent explanations of predictions. Accordingly, there is a need to improve XAI and provide intelligible and usable interpretations and/or explanations of AI technology predictions in a more consistent manner for a broader range of users. This need has stemmed from the development and adoption of AI-based technologies and growing ubiquity of AI technologies that permeates the everyday lives of a broad spectrum of users.

In view of the foregoing, and as introduced above, implementations of the present disclosure provide user-interpretable semantic indications for output of ML models. More particularly, implementations of the present disclosure are directed to a semantic translation service that translates output of ML models to a semantic scale that is more easily digestible for a relatively broad range of users. That is, the semantic translation service of the present disclosure provides a semantic result providing meaning to a prediction output by a ML model based on a set of metrics at least partially output by the ML model with the prediction.

In some implementations, and as described in further detail herein, the semantic translation service receives an output data set from a ML service, the output data set including a prediction and a set of metrics. The semantic translation service processes the set of metrics to provide a semantic result for the prediction. In some implementations, the semantic translation service generates a numerical value based on the metrics in the set of metrics and maps the numerical value to a semantic result (semantic value). In some examples, the semantic result provides a semantic meaning as an intelligible indication of the prediction. In this manner, users, such as non-expert users, are provided with a better and more transparent understanding of the prediction.

In some implementations, the semantic result can be provided as a category (or classes) that lies along a scale of semantic results. An example scale of semantic results includes, without limitation, a scale of categories. An example scale of categories can include High, Medium, and Low. Another example scale of categories can include Very High, High, Medium, Low, and Very Low. Another example scale of categories can include a series of numbers lying along a range of numbers (e.g., 1.0 to 10.0). In some examples, a numerical value calculated based on the set of metrics is mapped to the scale of categories to determine the semantic result that is to be associated with the prediction.

As also described in further detail herein, the semantic translation service of the present disclosure can be provided in parallel with and supplement an XAI service. For example, the XAI service can process input to and output from a ML model (e.g., provided from the ML service) to provide a natural language description (e.g., indicating why a prediction was made) and a set of indicators, each indicator providing insight as to why the prediction was made. In some examples, the semantic result of the present disclosure is presented with the prediction and at least a portion of an explanation output of the XAI service (e.g., in a user interface (UI)).

Implementations of the present disclosure are described in further detail herein with reference to example use cases. It is contemplated, however, that implementations of the present disclosure can be realized for any appropriate use case and are not limited to those discussed herein.

A first example use case includes a medical diagnosis scenario, in which a ML service is used to a predict a diagnosis (e.g., presence or absence of cancer based on medical images input to a ML model). In such a medical diagnosis scenario, diagnoses and decision based on diagnoses are considered high-stakes (critical), where, for example, predictions are used to determine appropriate treatment. Implementations of the present disclosure provide a semantic result that represents a semantic quality of a prediction. In this manner, a user (e.g., a doctor is assisted in assessing the reliability of the ML model output more objectively and in context. The user is enabled to take on informed decisions and does not treat the ML model as infallible, but as a tool to understand the situation and relevant factors better as well as informational bases for making any estimate or prediction about the patient.

A second example use case includes using a ML service to predict qualities of different wines (e.g., based on input to a ML model indicating characteristics of each wine for wine production monitoring and controlling). In such a use case, decisions based on the ML predictions can be considered medium- to low-stakes decisions, guiding, and or trend indication. In this scenario, while a semantic result is provided, the semantic results need not be exposed to the user. For example, the semantic result can be used to determine whether a prediction is to be displayed at all due to an insignificant level of reliability (e.g., low or very-low prediction quality). In this manner, only predictions having a higher reliability (e.g., medium, high, very high) are displayed. However, semantic results and corresponding thresholds are accessible to administrative users, such as configuration experts, analysts or any role that has the competence to evaluate the implied risk or opportunities of a smaller or larger quality threshold.

FIG. 1 depicts an example architecture 100 that can be used to execute implementations of the present disclosure. In the depicted example, the example architecture 100 includes a client device 102, a server system 104, and a network 106. The server system 104 includes one or more server devices 108. In the depicted example, a user 110 interacts with the client device 102. In an example context, the user 110 can include a user that interacts with an application that is hosted by the server system 104. In some examples, the application provides functionality that is at least partially based on predictions provided from a ML service. For example, the user 110 can be a winemaker that operates a winemaking enterprise using the application. As another example, the user 110 can be a consumer of wine that makes purchasing decisions based on predictions provided from a ML service. As still another example, the user can be a doctor that uses the application to support medical treatment decisions for patients. For example, a session can be established between the client device 102 and one or more server devices 108, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to, a web server, an application server, a proxy server, a network server, and/or a server pool. In general, server systems accept requests for application services and provides such services to any number of client devices (e.g., the client device 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

In some implementations, the server system 104 hosts a ML platform providing a ML service that generates predictions (e.g., in response to prediction requests). In accordance with implementations of the present disclosure, the ML platform includes a semantic translation service the provides semantic results for predictions provided by the ML service. Each semantic result can be provided as output of the ML platform, in hand with the associated prediction, for presentation to the user 110 (e.g., in a UI displayed by the client device 102). For example, the user 110 interacts with an application using the client device 102, which interaction results in the application transmitting a prediction request to the ML platform. The ML platform processes the prediction request to provide a prediction and a semantic result, and returns a prediction result back to the application. In some examples, the prediction result includes the prediction and the semantic result.

Figure 2:
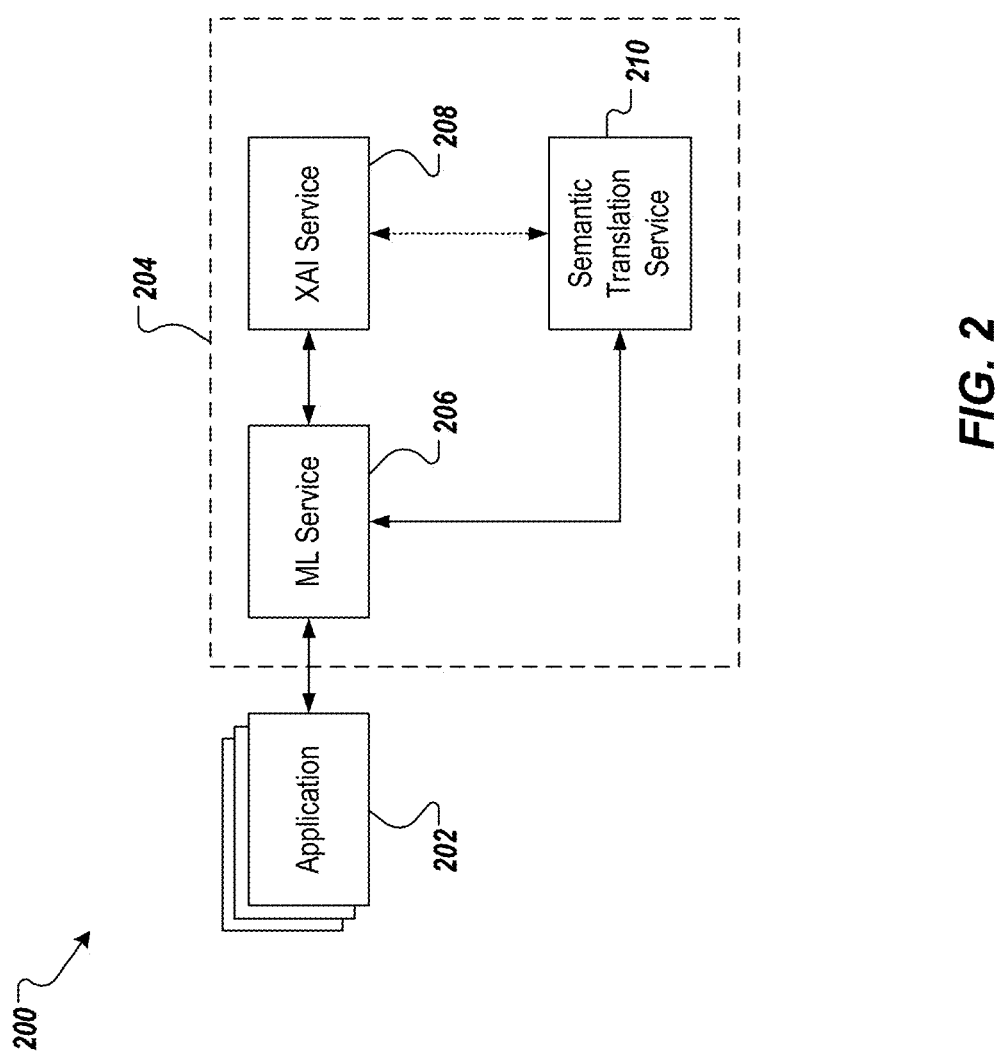
FIG. 2 depicts a conceptual architecture in accordance with implementations of the present disclosure.

FIG. 2 depicts a conceptual architecture 200 in accordance with implementations of the present disclosure. In some examples, the conceptual architecture 200, or at least a portion thereof, can be hosted within a server system (e.g., the server system 104 of FIG. 1). In the example of FIG. 2, the conceptual architecture 200 includes one or more applications 202 and a ML platform 204. In some examples, and as described in further detail herein, an application 202 transmits a prediction request to the ML platform 204. The prediction request can include, without limitation, a set of input values. The ML platform processes the prediction request to provide a prediction and a semantic result, and returns a prediction result back to the application. In some examples, the prediction result includes, without limitation, the prediction and the semantic result.

In further detail, and in the depicted example, the ML platform 204 includes a ML service 206, an XAI service 208, and a semantic translation service 210. An example ML service 206 can include, without limitation, the Predictive Analysis Library (PAL) provided by SAP SE of Walldorf, Germany, and delivered with SAP HANA. In some examples, PAL can be described as an application function library (AFL) that defines functions that can be called to perform predictive analytics, which can be programmatically embodied in one or more ML models. Example predictive analytics supported by PAL include, without limitation, clustering, classification, regression, association, time series, preprocessing, statistics, and the like. While PAL is introduced herein by way of non-limiting example, it is contemplated that implementations of the present disclosure can be realized using any appropriate ML service.

In general, and as described in further detail herein, the ML service 206 receives prediction requests from at least one of the one or more applications 202. In some examples, the ML service 206 provides an output data set to the XAI service 208 and/or the semantic translation service 210. In some examples, the output data set at least partially includes a prediction and a set of metrics. For example, when providing the output data set to the XAI service 206, the output data set can include an input data set that includes input to a ML model executed by the ML service to provide the prediction. In some examples, the XAI service processes at least a portion of the input data set and the output data set to provide an explanation data set. In some examples, the explanation data set includes a natural language description and/or a set of indicators, as described in further detail herein. In some examples, the semantic translation service 210 processes at least a portion of the output data set to provide a semantic result.

In further detail, an application 202 can be configured to interact with users (e.g., the user 110 of FIG. 1) and receives a ML prediction request from the user. For example, the user can provide input to the application 202, which prompts the application to issue a prediction request. In some examples, the application 202 packages a prediction request and transmits the prediction request to the ML service 204. In some examples, the prediction request includes a set of input values and one or more unique identifiers. Example input values can include, without limitation, data that is to be provided as input for generating a prediction and/or location data indicating location(s) of data that is to be provided as input for generating a prediction (e.g., location(s) of data within a database). Example unique identifiers can include, without limitation, an application identifier (e.g., uniquely identifying the application 202 issuing the prediction request among multiple applications 202), a user identifier (e.g., uniquely identifying the user interacting with the application), and an enterprise identifier (e.g., uniquely identifying an enterprise, on behalf of which the application 202 is executed).

In some examples, the ML service 206 receives the prediction request from the application 202 and generates a prediction and a set of metrics based on the prediction request. In some examples, the ML service 206 selects an ML model to generate the prediction based on the prediction request from a library of ML models maintained within the ML platform 204. For example, the ML model can be selected from a set of ML models based on a unique identifier (e.g., an enterprise identifier, where the ML model is selected as being specific to the enterprise, such as having been trained using data of the enterprise). The ML service 206 generates the prediction based on data (e.g., retrieved from a database) and the selected ML model indicated in (or determined from) the prediction request.

In some implementations, the ML service 206 generates an output data set that at least partially includes a prediction and a set of metrics. Example predictions can include, without limitation, a category (e.g., assigning one or more items to categories), a class (e.g., assigning one or more items to classes), a ranking (e.g., ranking one or more items relative to one another), a rating (e.g., assigning a rating to one or more items), a recommendation, a grouping (e.g., assigning one or more items to groups), a matching (e.g., matching one or more items to each other), and the like. In some examples, the set of metrics includes metrics representative of the ML model and the performance of the ML in generating the prediction. That is, the set of metrics represents a competency of the ML model in making the particular prediction. Example metrics include, without limitation, a confidence score (C), an accuracy score (A), an error rate (ER), and an error value (EV).

In some examples, the confidence score indicates a confidence that the prediction is accurate. For example, the confidence score is specific to the prediction that is provided by the ML model. In some examples, confidence in a particular prediction can be based on the input that is provided to the ML model, and which the particular prediction is generated on. For example, more robust, higher quality input will result in a higher confidence score than less robust and/or lower quality input. That is, for example, a first prediction based on input of one data value can have a first confidence value, and a second prediction based on input of multiple data values can have a second confidence value, the second confidence value being greater than the first confidence value. Accordingly, the confidence score is prediction-specific.

In some examples, the accuracy score represents an accuracy of the ML model in making predictions. For example, the accuracy score represents a frequency, at which the ML model provides correct predictions. In some examples, the error rate can be based on a number of false positives and a number of false negatives of the ML model. In some examples, the error value can indicate a degree to which a prediction is incorrect (e.g., representative of how wrong a prediction is). For example, the error value can be an average error in predictions determined during training of the ML model (e.g., when incorrect, how far off (an average) from the correct prediction). In some examples, the accuracy score, the error rate, and the error value are each specific to the ML model and remain static regardless of particular predictions. In some examples, the accuracy score, the error rate, and the error value are each provided as a result of training of the ML model.

In some implementations, the semantic translation service 210 receives the output data set from the ML service 206 and generates a semantic result based on the set of metrics. In some examples, determination of the semantic result is based on a configuration that defines a relationship for calculation of a numerical value and mapping of the numerical value to a semantic scale. In some examples, the configuration is specific to the ML model used to generate the prediction. For example, a first ML model can be associated with a first configuration and a second ML model can be associated with a second configuration. Semantic results for predictions provided from the first ML model are provided using the first configuration, while semantic results for predictions provided from the second ML model are provided using the second configuration. In some examples, each configuration is provided based on user input defining the configuration.

Figure 3:
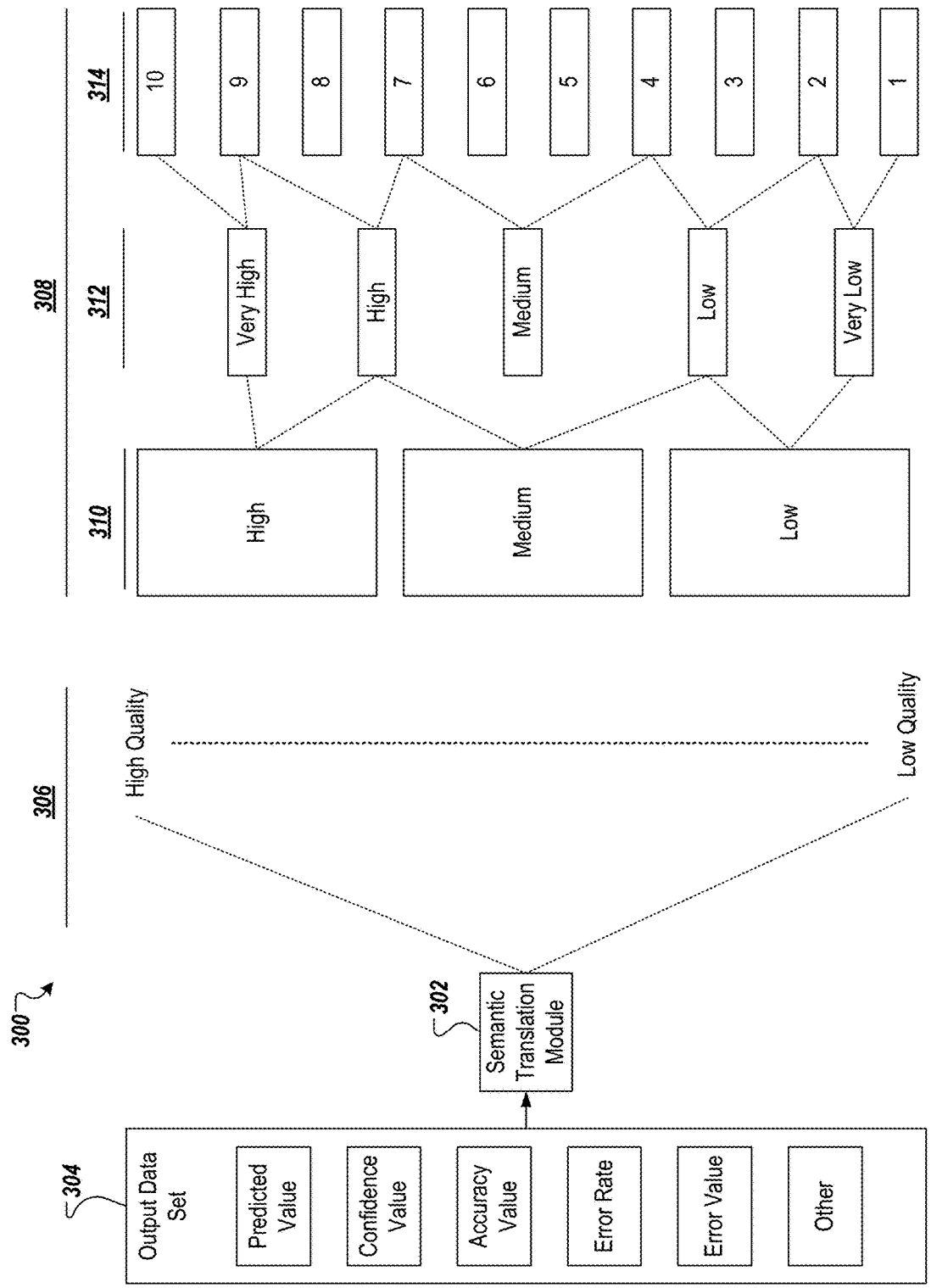
FIG. 3 depicts example configurations for generating semantic results in accordance with implementations of the present disclosure.

FIG. 3 depicts example configurations 300 for generating semantic results in accordance with implementations of the present disclosure. In the example of FIG. 3, a semantic translation module 302 is provided (e.g., as a module of the semantic translation service 210 of FIG. 2), which receives an output data set (e.g., from the ML service 206 or the XAI service 208 of FIG. 2). In some examples, the semantic translation module 302 calculates numerical values based on the configuration provided for a respective ML model. In some examples, the semantic translation module projects each numerical value to a semantic scale as defined in the configuration. That is, and as described in further detail herein, the configuration defines a semantic scale and a mapping of numerical values to the semantic scale.

In some implementations, a configuration can provide that the numerical value is conceptually mapped to a continuous scale projection 306. In the example of FIG. 3, the continuous scale projection 306 ranges from high quality (e.g., the prediction is of high quality and can be trusted) to low quality (e.g., the prediction is of low quality and likely cannot be trusted). In some examples, where the numerical value maps to the continuous scale projection 306 can be determined based on processing the numerical value using a set of mapping rules. An example mapping rule can provide that the numerical value maps directly to an equivalent value on the continuous scale projection 306. For example, the continuous scale projection 306 can be defined as a range of values (e.g., [0.25, 1.0], where 0.25 corresponds to low quality and 1.0 corresponds to high quality). In some examples, if the numerical value is less than 0.25, the numerical value maps to 0.25 (i.e., as a lower bound). In some examples, a semantic result can be provided. In this example, an example semantic result can be expressed as the numerical value "out of" the highest value in the range of values (e.g., 0.95/1.00, 9.5/10, or 95/100).

In some implementations, the configuration can define one or more bucketized projections 308. For example, a bucketized projection 308 can include a plurality of buckets, to which numerical values can be mapped, each bucket representing a respective category (e.g., category indicating quality of prediction). In the example of FIG. 3, a first bucketized projection 310, a second bucketized projection 312, and a third bucketized projection 314 are provided and include respective granularities (e.g., number of categories). For example, the first bucketized projection 310 includes three categories, while the third bucketized projection 314 includes 10 categories. It is contemplated that a bucketized projection can include any appropriate number of two or more categories.

In some examples, where the numerical value maps to a bucketized projection 308 can be determined based on processing the numerical value using a set of mapping rules. Example mapping rules can include, without limitation, for each category, an upper threshold and/or a lower threshold, within which the numerical value lies to be assigned to the respective category. In some examples, the semantic result is the category that the numerical value maps to. For example, if the configuration for the ML model uses the first bucketized projection 310, the semantic result is provided as one of "High," "Medium," or "Low" (e.g., indicating a quality of a respective prediction). As another example, if the configuration for the ML model uses the second bucketized projection 312, the semantic result is provided as one of "Very High," "High," "Medium," "Low," or "Very Low" (e.g., indicating a quality of a respective prediction).

In further detail, in the example of the first bucketized projection 310, a numerical value that is equal to or greater than 0.75 (e.g., 75%) is mapped to the semantic result of "High," a numerical value that is equal to or greater than 0.50 (e.g., 50%) and is less than 0.75 is mapped to the semantic result of "Medium," and a numerical value that is equal to or greater than 0.25 (e.g., 25%) and is less than 0.25 is mapped to the semantic result of "Low." In some examples, the thresholds corresponding to each of the semantic results can be customized or adjusted based on actual practice, for example, the cruciality of the prediction, feedback from users, or risk management. For example, for predictions related to cancer diagnosis, the semantic result "High" can be more difficult to meet by adjusting the lower threshold (e.g., only numerical values above 0.90) to mitigate likelihood of misdiagnosis, if any.

In the example use case of medical diagnosis, such as cancer, the prediction is related to a diagnosis of certain type of cancer, for example. The user is able to trust that the prediction of the presence of absence of cancer is accurate in response to the semantic result of "High" (or "Very High"), is alerted to the need to have a more detailed analysis (e.g., confirmation of the prediction result, further verification of the presence/absence of cancer) in response to the semantic result of "Medium," and is not able to trust that the prediction of cancer or no cancer is accurate in response to the semantic result of "Low" (or "Very Low").

In some implementation, the semantic result can be at least partially based on the user. For example, a user profile associated with the user can be accessed (e.g., based on the user identifier) and data representative of the user can be used to influence the semantic result that is presented to the user. For example, the particular projection can be selected based on an experience level and/or technical competence level of the user in a respective domain, as indicated by data from the user profile. Users, such as data scientists, software engineers, or specialists in a particular domain (e.g., oncologists, winemakers) can make sense of granular semantic results, while less experienced users need a less granular (unambiguous) semantic result (e.g., high, medium, low). Accordingly, the projection, to which the numerical value is mapped and semantic result is determined, can be selected from the configuration of the ML model based on the user (e.g., the projection 306, 314 for experienced users, the projection 310, 312 for inexperienced users). For example, if the user profile indicates that the user is an oncologist, a first projection can be selected, and if the user profile indicates that the user is a patient, a second projection can be selected.

In some implementations, and as described in further detail herein, one or more metrics in the set of metrics is processed to generate a numerical value (NV) and the numerical value is mapped to the semantic result in a scale of semantic results, as discussed above with reference to FIG. 3. In some examples, the numerical value is generated based on a relationship between metrics in the set of metrics. The relationship is provided in the configuration for the ML model. An example relationship is provided as:

$$NV = \alpha_1 C + \alpha_2 A + \alpha_3 ER + \alpha_4 EV$$

where $\alpha_1$, $\alpha_2$, $\alpha_3$, and $\alpha_4$ are weights that each affects an influence of a respective metric on the numerical value. Another example relationship can be provided as:

$$NV = \text{AVG}[\alpha_1 C, \alpha_2 A, \alpha_3 ER, \alpha_4 EV]$$

In some examples, prior to calculating the numerical value, each of the metric values is normalized, such that each metric value is within a predetermined range (e.g., [0, 1]).

In some examples, the semantic result can be provided as a category (or classes) that lies along a scale of semantic results. An example scale of semantic results includes, without limitation, a scale of categories (e.g., as described above with reference to FIG. 3). As described herein, the semantic result provides a semantic indication for the prediction that is more easily understandable for users. The semantic result is provided back to the ML service 206.

In some implementations, the XAI service 208 receives the output data set and an input data set and processes each to provide an explanation data set. An example XAI service includes Local Interpretable Model-Agnostic Explanations (LIME). In some examples, LIME can be described as an open source library that generates an explanation data set that represents an explanation of predictions of ML models by locally approximating the ML model with an interpretable model. In some examples, LIME modifies a data sample by adjusting feature values and observes the resulting impact on the prediction. In general, LIME provides a set of explanations representing the contribution of each feature to a prediction for a single sample, which can be described as a form of local interpretability. Other example XAI services include Layer-wise relevance propagation (LRP), and SHaply Addictive exPlanation (SHAP). It is contemplated that implementations of the present disclosure can be used with any appropriate XAI service.

In general, the XAI service 208 generates an explanation data set, which provides a quantitative view on the prediction provided by the ML service 206. In some examples, the explanation data set includes a natural language description and a set of indicators. In some examples, indicators in the set of indicators are ranked in order of influence on the prediction (e.g., indicators that more heavily influenced the prediction are ranked higher than indicators that had less influence on the prediction). In general, the explanation data set embodies a quantitative result that provides quantitative reasoning of the prediction, such as how and why the particular prediction was made.

In the example of FIG. 2, the ML service 206 receives the semantic result from the semantic translation service 210 (e.g., directly or indirectly through the XAI service 208) and receives the explanation data set from the XAI service 208. The ML service 206 provides a prediction result to the application 202, which had originally submitted the prediction request. In some examples, the prediction result includes the prediction, the semantic results, and the explanation data set. In some examples, the application 202 presents the prediction result to the user (e.g., the user 110 of FIG. 1). For example, and as described in further detail herein, the application 202 can cause one or more UIs to be displayed to the user, which include, among other information, the prediction, the semantic results, and the explanation data set.

In some examples, a series of UIs can be provided for progressive disclosure of details representing the prediction. In this manner, overwhelming a user, particularly a non-expert user, with too much information can be avoided. For example, a first UI can provide a high-level summary, a second UI can provide a next-level of detail, and a third UI can provide a granular-level of detail. This enables the user to drill-down into information underlying the prediction, as needed.

Figure 4B:
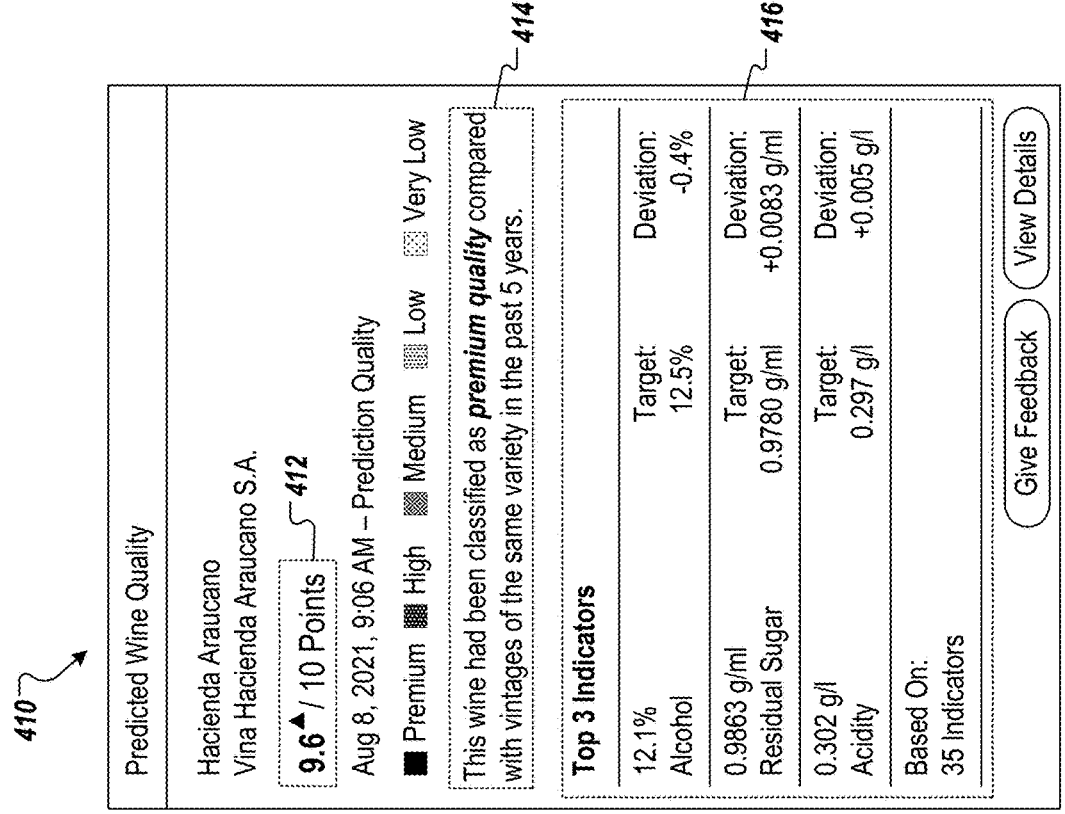

FIGS. 4A-4C depict example UIs in accordance with implementations of the present disclosure. The examples of FIGS. 4A-4C are based on the example use case of using a ML service to predict qualities of different wines (e.g., based on input to a ML model indicating characteristics of each wine). In some implementations, the example UIs of FIGS. 4A-4C provide a progressive disclosure the first level of the progressive disclosure of details representing the prediction.

With particular reference to FIG. 4A, a UI 400 is depicted and includes a table 402 having rows depicting respective products and product details (e.g., wines and details on each wine). In accordance with implementations of the present disclosure, products can include a prediction summary 404 associated therewith, which includes a prediction. In the depicted example, the prediction summary 404 includes the prediction "Premium" and "9.6," which are provided from a ML model (e.g., a classifier that classifies wines into categories). In some examples, a semantic result is provided from the semantic translation service (e.g., the semantic translation service 210 of FIG. 2), but is not displayed in the UI 400. For example, if the semantic result meet or exceeds a threshold (e.g., medium, high, very high), the prediction is determined to be of sufficient quality to display to the user. However, if the semantic result does not meet or exceed the threshold, the prediction is determined to be of insufficient quality to display to the user. In some implementations, the user can select (e.g., click on) an entry of the table 402 of the UI 400 to drill-down into further detail.

For example, in response to user selection of the first entry of the table 402, a UI 410 depicted in FIG. 4B is displayed. In some examples, the UI 410 is concurrently displayed with the UI 400 (e.g., "popping-out" from the UI 400). As depicted in FIG. 4B, the UI 410 provides a next-level of detail along the progressive disclosure. In some examples, the next-level of detail provides further detail on the prediction result, which can include explanation data. For example, the explanation data includes at least a portion of an explanation data set provided from a XAI service (e.g., the XAI service 208 of FIG. 2). In the example of FIG. 4B, a prediction summary 412 is provided, which includes the prediction in context (e.g., 9.6 out of 10 points). In the example of FIG. 4B, a natural language description 414 and a set of indicators 416 are displayed, which are included in the explanation data set provided from the XAI service.

Referring to FIG. 4C, a UI 420 is depicted, which provides granular detail on the prediction result. In the example of FIG. 4C, the result summary 412 of FIG. 4B is provided, which includes the prediction in context (e.g., 9.6 out of 10 points), as described herein. The UI 420 also includes the natural language description 414 of FIG. 4B. The UI 420 further includes an expanded set of indicators 422, which provide further reasoning into the prediction provided by the ML model.

Implementations of the present disclosure can further include a centralized explanation service for predictions of ML models. In some implementations, the centralized explanation service is hosted in cloud platform (e.g., the SAP Cloud Platform provided by SAP SE). For example, the XAI service 208 and the semantic translation service 210 of FIG. 2 can be components of the centralized explanation service. In some examples, the centralized explanation service is bound to a standardized user experience (UX) platform for communicating explanations to users.

In some implementations, one or more applications can call ML services (e.g., call the ML service 206) or can connect their existing ML solutions to the centralized explanation service. That is, in some examples, an application can generated its own ML-based output data set and transmit the output data set to the centralized explanation service (e.g., bypassing a centralized ML service, such as the ML service 206). In this manner, the centralized explanation service is provided as a technically standardized backend service and a standardized frontend UX is provided for users.

Figure 5:
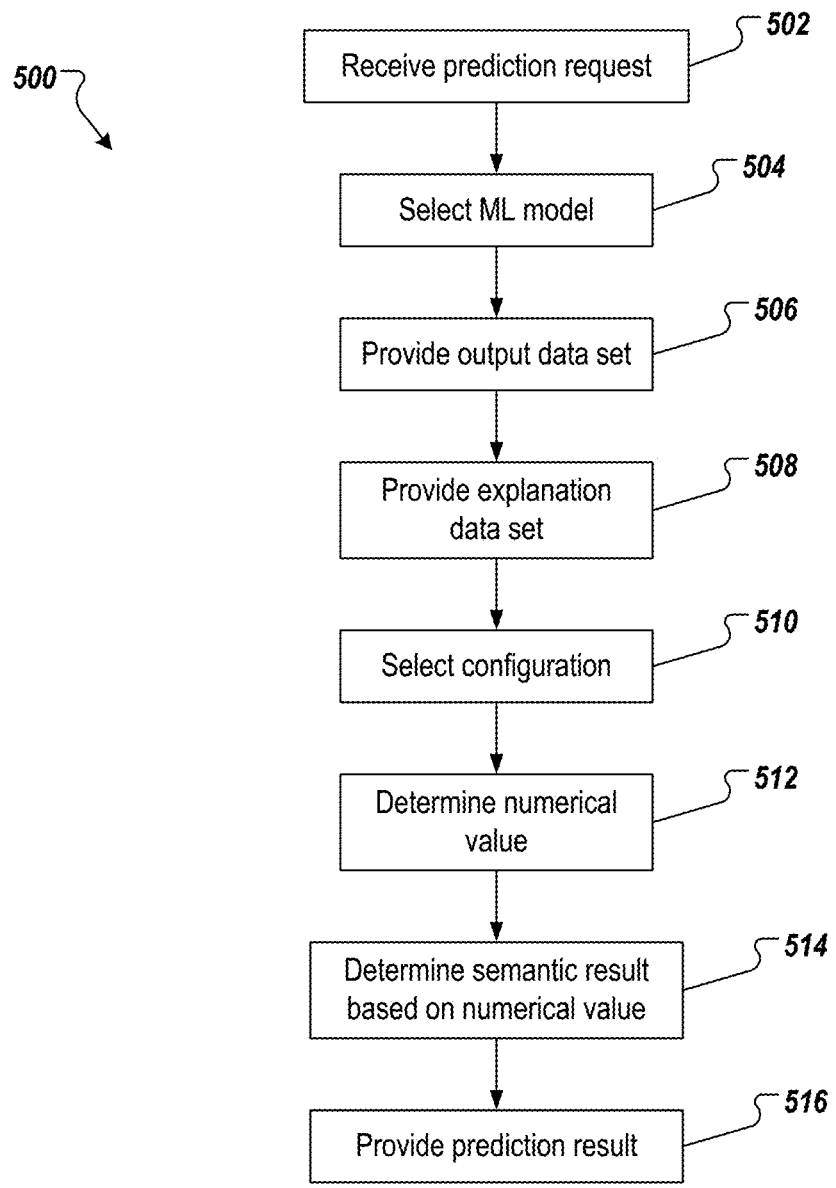
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices (e.g., the server devices 108 of FIG. 1). The example process 500 is executed for generating user interpretable semantic indication of a prediction provide from a ML model.

A prediction request is received (502). For example, and as described in detail herein, an application 202 transmits a prediction request to the ML platform 204 of FIG. 2. In some examples, the prediction request includes a set of input values and one or more unique identifiers. Example input values can include, without limitation, data that is to be provided as input for generating a prediction and/or location data indicating location(s) of data that is to be provided as input for generating a prediction (e.g., location(s) of data within a database). Example unique identifiers can include, without limitation, an application identifier, a user identifier, and an enterprise identifier. A ML model is selected (504). For example, and as described herein, the ML service 206 can select a ML model from a set of ML models based on one or more of the unique identifiers (e.g., a ML model associated with the enterprise, a ML model associated with the application).

An output data set is provided (506). For example, the ML model processes an input data set to generate the output data set. In some examples, the output data set includes a prediction and a set of metrics (e.g., confidence score, accuracy score, error rate, error value, etc.). An explanation data set is provided (508). For example, the XAI service 208 receives one or more data sets from the ML service 206 and processes the one or more data sets (e.g., using one or more of LIME, LRP, and SHAP) to provide the explanation data set. In some examples, and as described herein, the explanation data set includes a natural language description and a set of indicators.

A configuration is selected (510). For example, and as described in detail herein, the semantic translation service 210 receives the output data set (or at least a portion thereof) from the ML service 206. In some examples, the output data set provides an indication of the ML model that generated the prediction (e.g., a unique identifier that uniquely identifies the ML model). The configuration is selected from a set of configurations based on the ML model that provided the prediction. A numerical value is determined (512). For example, and as described herein, two or metrics in the set of metrics are processed through a relationship to provide the numerical value. The relationship is defined in the configuration.

A semantic result is determined based on the numerical value (514). For example, and as described herein, the numerical value is mapped to one or more projections (e.g., continuous projection, bucketized projection) to provide the semantic result. A prediction result is provided (516). For example, and as described in further detail herein, the ML service 206 receives the semantic result from the semantic translation service and provides a prediction result to the application 202. In some examples, the prediction result includes the output data set and the semantic result. In some examples, the prediction result also includes the explanation data set. The prediction result (or at least a portion thereof) is displayed to a user (e.g., using one or more UIs, such as the example UIs of FIGS. 4A-4C).

In some implementations, and as described herein, prior to displaying the prediction result, the semantic result can be compared a threshold. In some examples, if the semantic result meets or exceeds the threshold, the prediction result is displayed (e.g., with the semantic result, without the semantic result). In some examples, if the semantic result does not meet or exceed the threshold, the prediction result is not displayed.

Figure 6:
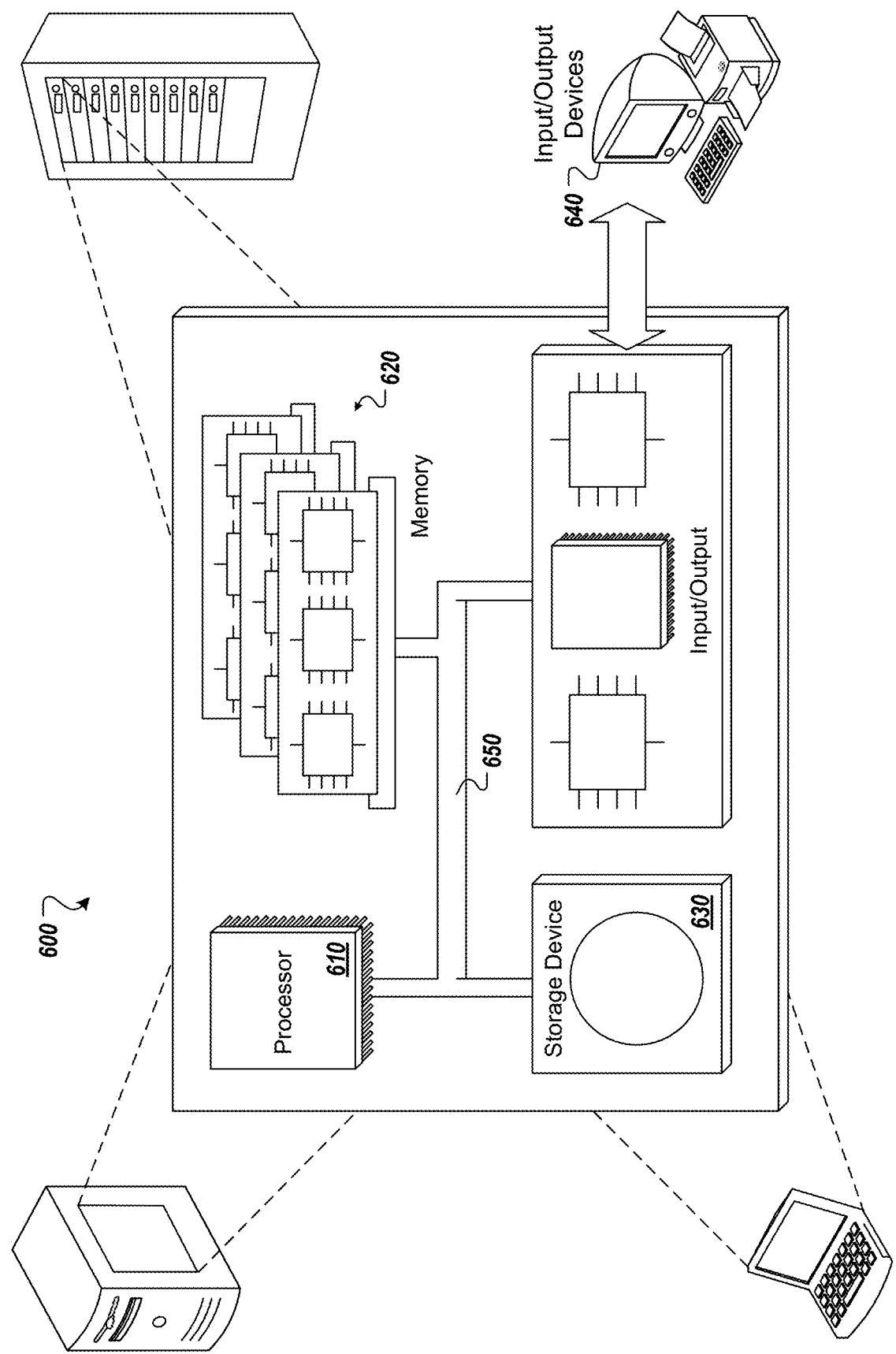
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing user-interpretable semantic indications of machine learning (ML) predictions, the method comprising:
   receiving, by a semantic translation service of a ML platform, an output data set from a ML model, the output data set comprising a predicted value and a set of metrics;
   determining, by the semantic translation service, a numerical value based on at least two or more metrics in the set of metrics;
   selecting, by the semantic translation service, a semantic result by mapping the numerical value to a projection comprising two or more semantic values;
   transmitting, by the ML platform, a prediction result at least partially comprising the semantic result for selective display to a user using one or more user interfaces; and
   receiving, from an explanation service of the ML platform, an explanation data set representative of a quantitative result at least partially based on the output data set, the explanation data set comprising a natural language explanation and a set of indicators, the prediction result comprising the explanation data set.

2. The method of claim 1, further comprising retrieving, by the semantic translation service a configuration that is specific to the ML model from computer-readable memory, the configuration defining a relationship between the at least two or more metrics for determining the numerical value and the projection.

3. The method of claim 1, wherein the projection comprises one of a continuous projection and a bucketized projection comprising two or more categories.

4. The method of claim 1, wherein the set of metrics comprises a confidence score, an accuracy score, an error rate, and an error value.

5. The method of claim 1, wherein the projection is at least partially selected based on user data representative of the user.

6. The method of claim 1, wherein the semantic result is displayed to the user in a first UI providing a first level of detail of the prediction result and in a second UI providing a second level of detail of the prediction result, the second level of detail being more granular than the first level of detail.

7. A non-transitory computer-readable storage medium coupled to one or more processors and having instructions stored thereon which, when executed by the one or more processors, cause the one or more processors to perform operations for providing user-interpretable semantic indications of machine learning (ML) predictions, the operations comprising:
   receiving, by a semantic translation service of a ML platform, an output data set from a ML model, the output data set comprising a predicted value and a set of metrics;
   determining, by the semantic translation service, a numerical value based on at least two or more metrics in the set of metrics; selecting, by the semantic translation service, a semantic result by mapping the numerical value to a projection comprising two or more semantic values;
   transmitting, by the ML platform, a prediction result at least partially comprising the semantic result for selective display to a user using one or more user interfaces; and
   receiving, from an explanation service of the ML platform, an explanation data set representative of a quantitative result at least partially based on the output data set, the explanation data set comprising a natural language explanation and a set of indicators, the prediction result comprising the explanation data set.

8. The non-transitory computer-readable storage medium of claim 7, wherein operations further comprise retrieving, by the semantic translation service a configuration that is specific to the ML model from computer-readable memory, the configuration defining a relationship between the at least two or more metrics for determining the numerical value and the projection.

9. The non-transitory computer-readable storage medium of claim 7, wherein the projection comprises one of a continuous projection and a bucketized projection comprising two or more categories.

10. The non-transitory computer-readable storage medium of claim 7, wherein the set of metrics comprises a confidence score, an accuracy score, an error rate, and an error value.

11. The non-transitory computer-readable storage medium of claim 7, wherein the projection is at least partially selected based on user data representative of the user.

12. The non-transitory computer-readable storage medium of claim 7, wherein the semantic result is displayed to the user in a first UI providing a first level of detail of the prediction result and in a second UI providing a second level of detail of the prediction result, the second level of detail being more granular than the first level of detail.

13. A system, comprising: a computing device; and a computer-readable storage device coupled to the computing device and having instructions stored thereon which, when executed by the computing device, cause the computing device to perform operations for providing user-interpretable semantic indications of machine learning (ML) predictions, the operations comprising:
   receiving, by a semantic translation service of a ML platform, an output data set from a ML model, the output data set comprising a predicted value and a set of metrics;

determining, by the semantic translation service, a numerical value based on at least two or more metrics in the set of metrics; selecting, by the semantic translation service, a semantic result by mapping the numerical value to a projection comprising two or more semantic values;

transmitting, by the ML platform, a prediction result at least partially comprising the semantic result for selective display to a user using one or more user interfaces; and receiving, from an explanation service of the ML platform, an explanation data set representative of a quantitative result at least partially based on the output data set, the explanation data set comprising a natural language explanation and a set of indicators, the prediction result comprising the explanation data set.

14. The system of claim 13, wherein operations further comprise retrieving, by the semantic translation service a configuration that is specific to the ML model from computer-readable memory, the configuration defining a relationship between the at least two or more metrics for determining the numerical value and the projection.

15. The system of claim 13, wherein the projection comprises one of a continuous projection and a bucketized projection comprising two or more categories.

16. The system of claim 13, wherein the set of metrics comprises a confidence score, an accuracy score, an error rate, and an error value.

17. The system of claim 13, wherein the projection is at least partially selected based on user data representative of the user.

* * * * *